US008505287B1

(12) United States Patent
Babbitt et al.

(10) Patent No.: US 8,505,287 B1
(45) Date of Patent: Aug. 13, 2013

(54) MICRO-HYDRAULIC SUPPLY AND STORAGE UNITS FOR OPERATING HYDRAULIC SYSTEMS

(75) Inventors: Guy Robert Babbitt, Colorado Springs, CO (US); Jeffrey Allen Rogers, Woodland Park, CO (US); Miguel Angelo Raimao, Manitou Springs, CO (US); Jeffrey T. Gardner, Woodland Park, CO (US)

(73) Assignee: Sturman Industries, Inc., Woodland Park, CO (US)

( * ) Notice: Subject to any disclaimer, the term of this patent is extended or adjusted under 35 U.S.C. 154(b) by 1199 days.

(21) Appl. No.: 12/395,040

(22) Filed: Feb. 27, 2009

Related U.S. Application Data

(60) Provisional application No. 61/031,971, filed on Feb. 27, 2008.

(51) Int. Cl.
*F16D 39/00* (2006.01)

(52) U.S. Cl.
USPC .............................................. 60/327; 60/416

(58) Field of Classification Search
USPC .................. 60/413, 414, 416, 418, 420, 468, 60/327
See application file for complete search history.

(56) References Cited

U.S. PATENT DOCUMENTS

| | | | | |
|---|---|---|---|---|
| 6,666,022 | B1 * | 12/2003 | Yoshimatsu et al. | 60/413 |
| 7,185,634 | B2 * | 3/2007 | Gardner et al. | 123/446 |
| 7,269,944 | B2 * | 9/2007 | Zhang et al. | 60/414 |
| 7,472,546 | B2 * | 1/2009 | Anderson | 60/414 |

OTHER PUBLICATIONS

Mansouri, Ali R., "Adaptive Switched-Mode Control of a Hydraulic Pump", *A thesis submitted to the University of Colorado*, Technical Report EAS_ECE_2000_10, (Spring 2000).

* cited by examiner

*Primary Examiner* — Edward Look
*Assistant Examiner* — Logan Kraft
(74) *Attorney, Agent, or Firm* — Blakely Sokoloff Taylor & Zafman LLP

(57) ABSTRACT

Micro-hydraulic supply and storage units capable of recovering waste energy and storing energy for later use, such as for operating hydraulic valve actuation and high pressure fuel injection systems. The system includes a sump, a pump motor, an accumulator and a supply rail. Valving is provided to couple the outlet of the pump motor to the accumulator to fill the accumulator with what otherwise would be waste energy, such as when a vehicle is using its engine for braking, directing the output of the pump motor to a supply rail to maintain the pressure in the supply rail, and directing the output of the pump to a sump. The valving also allows directing an outlet of the accumulator to an inlet of the pump motor for recover of the energy in the accumulator. Other aspects of the invention are disclosed.

6 Claims, 2 Drawing Sheets

MICRO-HYDRAULIC SUPPLY AND STORAGE UNITS FOR OPERATING HYDRAULIC SYSTEMS

CROSS-REFERENCE TO RELATED APPLICATION

This application claims the benefit of U.S. Provisional Patent Application No. 61/031,971 filed Feb. 27, 2008.

BACKGROUND OF THE INVENTION

1. Field of the Invention

The present invention relates to the field of hydraulic pumps and supplies, including but not necessarily limited to those for operating engine Hydraulic Valve Actuation (HVA) and Hydraulically Intensified High Pressure Fuel Injection (HPFI) systems.

2. Prior Art

Hydraulically actuated fuel injectors are well known in the prior art, and hydraulic engine valve actuation is also known in the prior art. Both of these systems take significant power for their operation, so that overall engine efficiency is significantly affected by their operation. In the case of fuel injectors, power for high pressure fuel injection is required for good fuel atomization, and in the case of hydraulic engine valve actuation, the power requirement is generally more than offset by improved engine efficiency and flexibility in operation. However, engine efficiency can still be substantially improved by reducing engine output requirements for providing the needed hydraulic power.

In the prior art, various forms of fixed displacement pumps and variable displacement pumps have been used. Typically fixed displacement pumps have been oversized for many operating points and pump energy is wasted. Variable displacement pumps may not be able to supply multiple hydraulic rails. In general, prior art pumps are not able to capture and store energy during engine braking, or to supply power to engine.

Positive displacement pumps are also known in the prior art that include valving that allows coupling excess pump capacity back to the input of the pump to allow continuous operation of the pump, but with the excess pump capacity being pumped through a very low pressure differential. Such a system is disclosed in U.S. Pat. No. 7,185,634 entitled “High Efficiency, High Pressure Fixed Displacement Pump Systems and Methods”, owned by the assignee of the present invention.

DETAILED DESCRIPTION OF THE PREFERRED EMBODIMENTS

The present invention provides for the capture of some of the wasted energy during engine braking for use in operating the hydraulic supply unit.

Figure 1:
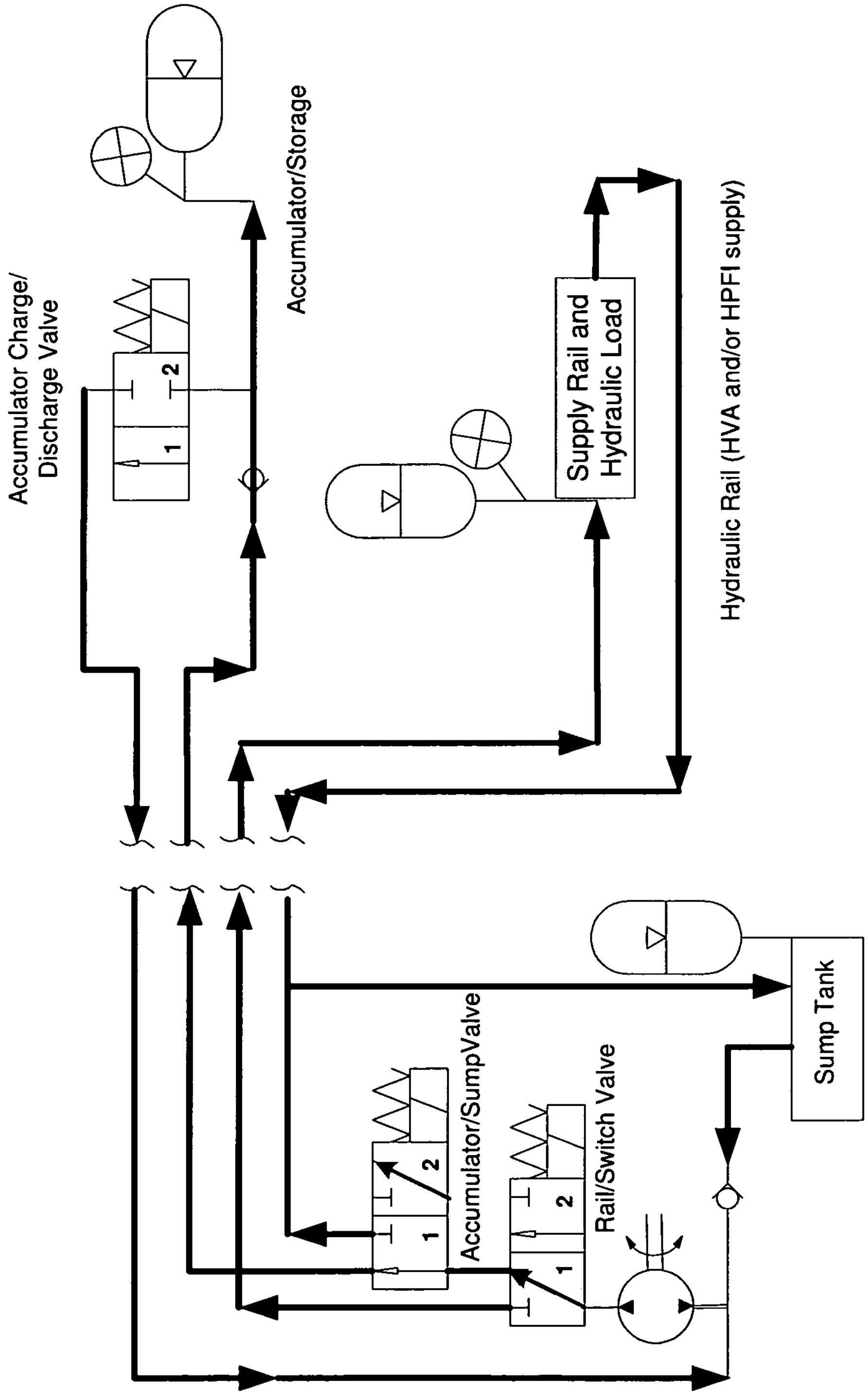
FIG. 1 is a block diagram of an exemplary embodiment of the present invention.

A simplified schematic of the proposed system supplying one hydraulic rail is shown in FIG. 1. In a preferred embodiment, a positive displacement pump in the form of a pump/motor is used. The pump/motor of the preferred embodiments is mechanically coupled to the engine crankshaft so as to be driven by the engine when the pressure at the outlet of the pump/motor exceeds the pressure at the inlet of the pump/motor, and to help drive the engine crankshaft when the pressure at the outlet of the pump/motor is less than the pressure at the inlet of the pump/motor. The flow out of the pump/motor will be directed via the rail/switch valve to a hydraulic supply rail (position 2) for operation of fuel injectors, hydraulic engine valve actuation system or both, or to the accumulator/sump valve (position 1). The rail/switch valve is the only high bandwidth (high speed) valve necessary in the system. The accumulator/sump valve can either be switched to the high pressure accumulator for storing high pressure hydraulic fluid, typically engine oil (position 1), or the sump tank (position 2), depending on the engine conditions. If the vehicle is braking, the accumulator/sump valve is switched to position 1 (the accumulator) and the rail/switch valve will then switch flow between the supply rail (position 2) and the accumulator (position 1). If the vehicle is accelerating or coasting, the accumulator/sump valve will be switched to the sump position (position 2) and the rail/switch valve will switch flow between the supply rail (position 2) and the sump tank (position 1). When the flow is switched to the sump tank there is very little pressure rise across the pump/motor and therefore very little energy used by the pump/motor. In both of the previously described operating conditions, the accumulator charge/discharge valve is in the closed position (position 2), which allows flow into but not out of the accumulator.

A third configuration exists when the accumulator charge/discharge valve is opened (position 1) and flow is allowed from the accumulator to the pump/motor inlet. The pump/motor inlet will then be pressurized and a check valve isolates the pump/motor inlet from the sump tank. The accumulator/sump valve is switched to the sump position (position 2) and the rail/switch valve then switches flow between the rail supply (position 2) and the sump tank (position 1). In this mode, the pump/motor acts as a motor and supplies torque to the engine. The pump/motor outlet pressure is either the rail supply pressure or the sump tank pressure. The torque supplied to the engine is proportional to the pressure differential across the pump/motor.

Note that the output of the pump/motor will need to be switched back and forth to the supply rail from time to time to maintain the desired pressure in the supply rail. In so doing, when the accumulator is coupled to the inlet of the pump/motor through the accumulator charge/discharge valve, a substantial part of the energy stored in the accumulator will be recovered, even if the accumulator pressure is less than the rail pressure. In particular, it is easier to pump from an elevated pressure than from a very low pressure, as the pump/motor is pumping through a lower pressure differential. Consequently energy may be recovered from the accumulator whenever it is pressurized, even when pumping to the rail at a higher pressure, regardless of how that pressure compares to the desired supply rail pressure.

The sump tank may be open to the atmosphere, though may also be pressurized at a low pressure, frequently desired to assure the needed flow from the sump when required. Still, the sump pressure would normally be orders of magnitude less than operating pressures in the oil rail and accumulator.

Figure 2:
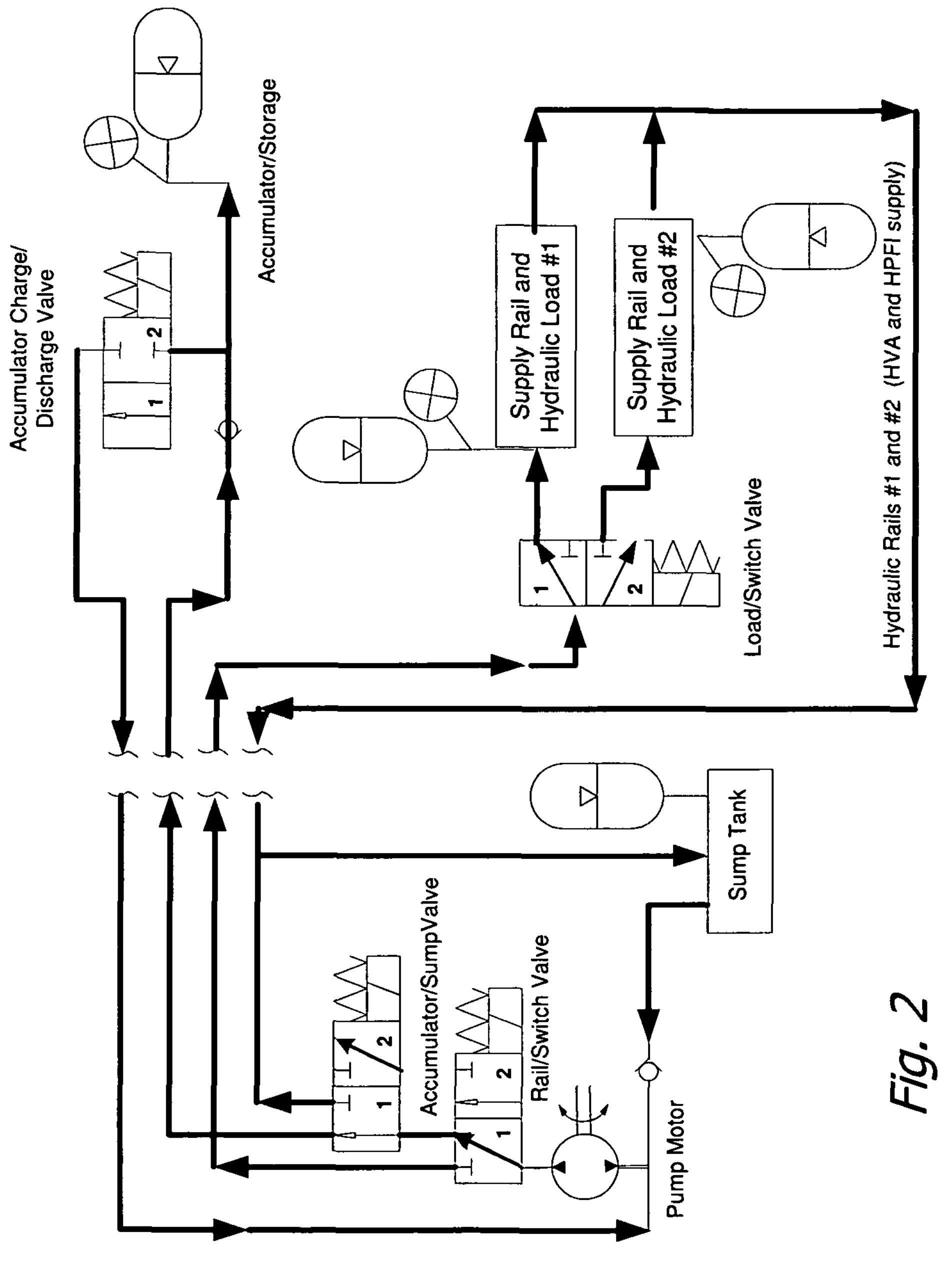
FIG. 2 is a block diagram of another exemplary embodiment of the present invention.

A schematic of the proposed system supplying two hydraulic rails is shown in FIG. 2. The supply rails could be held at the same pressure, but if two supply rails are used, they usually are held at two different pressures to power different engine functions. The only difference between the arrangement shown in FIG. 1 and FIG. 2 is the addition of the load/switch valve and the second supply rail/hydraulic load. The system behaves in exactly the same manner, only in this setup when the rail/switch valve is in position 2, the flow is either directed to supply rail #1 or supply rail #2, depending on the position of the load/switch valve. If the load/switch valve is in position 1 the flow is directed to supply rail #1 and if the load/switch valve is in position 2, the flow is directed to supply rail #2. The pressure control algorithms for the system will determine which rail gets the pump flow and for how long. In most cases the load/switch valve will also have to have high bandwidth.

Each supply rail may also have an accumulator associated therewith, though typically significantly smaller than the storage accumulator, with each accumulator/supply rail having a pressure relief valve for returning excess hydraulic fluid to the Sump Tank in the event of a control valve failure. Note that excess fluid pumped by the pump/motor is shown as being returned to the sump tank, though because of the check valve between the sump tank and the pump/motor, returning excess fluid pumped by the pump/motor to the sump tank is returning excess fluid pumped by the pump to the pump/motor inlet.

The system is preferably controlled by processor control, with pressures being sensed and fed back to the processor control for control of the various valves to maintain the required pressure in the supply rail, and to control the time of use of high pressure hydraulic fluid stored in the accumulator by coupling the same to the inlet to the Pump/Motor. Engine braking may be sensed by the engine speed being above the accelerator setting, and/or sensing that the engine is operating with or as if it had a Jacobs Engine Brake (a registered trademark of Jacobs Vehicle Systems, Inc.). In an electronically controlled hydraulic engine valve actuation system, such braking is easily controlled by the opening of the exhaust at or near the end of a compression stroke, and may be proportioned, as opposed to simply on and off as in a mechanical system. Pumping to the accumulator during engine braking simply somewhat increases the engine braking realized.

Thus the present invention captures engine braking energy to later power hydraulic systems that would normally be a parasitic load on the engine. It also maintains high efficiency of digital pump by using valves to bypass hydraulic rail when supply not needed. Further, the present invention adds torque to the engine while maintaining hydraulic supply to rails when using stored energy.

The embodiments described so far have been described in relation to providing pressurized actuation oil to an oil rail for operation of fuel injectors and hydraulic engine valve actuators, though the invention is not so limited. In particular, the oil may be engine oil, or may be some other hydraulic oil for use in hydraulic power steering, hydraulic brakes, or even for other hydraulic functions such as, by way of example, hydraulically actuated implements, power takeoffs, actuators and hydraulic fans.

The present invention may also be used to adjust the load on an engine to allow the engine to operate closer to an optimum efficiency point. By way of example, during a trip on the open road, so to speak, energy may be stored in the accumulator on slight downhill runs to increase a light engine load to a more efficient engine operating point, even when the engine is still pulling the vehicle, and used during uphill runs to reduce the overall engine load, again to a more efficient operating point. Whatever the operation of the system, the system absorbs energy from the engine crankshaft in an amount equal to that required to operate the hydraulic devices dependent thereon, or greater than that required to operate the hydraulic devices dependent thereon when it is also storing energy in the accumulator, regardless of whether the engine is acting as a brake, is pulling a load or is not even in gear. Similarly, the system provides energy to the engine crankshaft in an amount equal to that required to operate the hydraulic devices dependent thereon, or greater than that required to operate the hydraulic devices dependent thereon when it using energy stored in the accumulator, again regardless of whether the engine is acting as a brake, is pulling a load or is not even in gear. While some of these combinations would not be usual, still they are available for use when needed. For example, when a loaded vehicle becomes stuck in mud or sand, one might store energy in the accumulator with the vehicle not in gear, and then use that energy when trying to power out of the mud or sand for an extra boost in power.

While certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A method of recovering energy from an engine for operating hydraulically operated devices comprising:

pumping a hydraulic fluid by a pump/motor through a check valve from a low pressure sump to pressurize an accumulator and to maintain a predetermined pressure in a first supply rail, and pumping excess hydraulic fluid to the low pressure sump; and, coupling the accumulator to an inlet of the pump/motor through a fourth valving and coupling an output of the pump/motor directly to the low pressure sump when energy stored in the accumulator is to be used.

2. The method of claim 1 wherein the engine is in a vehicle, and wherein pumping to the accumulator is done to increase a light engine load toward a greater optimum engine load.

3. The method of claim 1 wherein the engine is in a vehicle, and wherein coupling the accumulator to an inlet of the pump/motor to use energy stored in the accumulator is done to decrease a heavy engine load toward an lower optimum engine load.

4. The method of claim 1 wherein the engine is in a vehicle and the pumping to pressurize the accumulator is done when the vehicle engine is being used for braking purposes.

5. The method of claim 1 further comprising pumping, using the same pump/motor, a hydraulic fluid through the check valve from the low pressure sump to maintain a predetermined pressure in a second supply rail.

6. The method of claim 5 wherein the predetermined pressure in the second supply rail is different than the predetermined pressure in the first supply rail.

* * * * *